Feb. 23, 1943.  C. LEVISON ET AL  2,312,178
ELECTRICAL CONTROL CIRCUIT
Filed Nov. 15, 1941
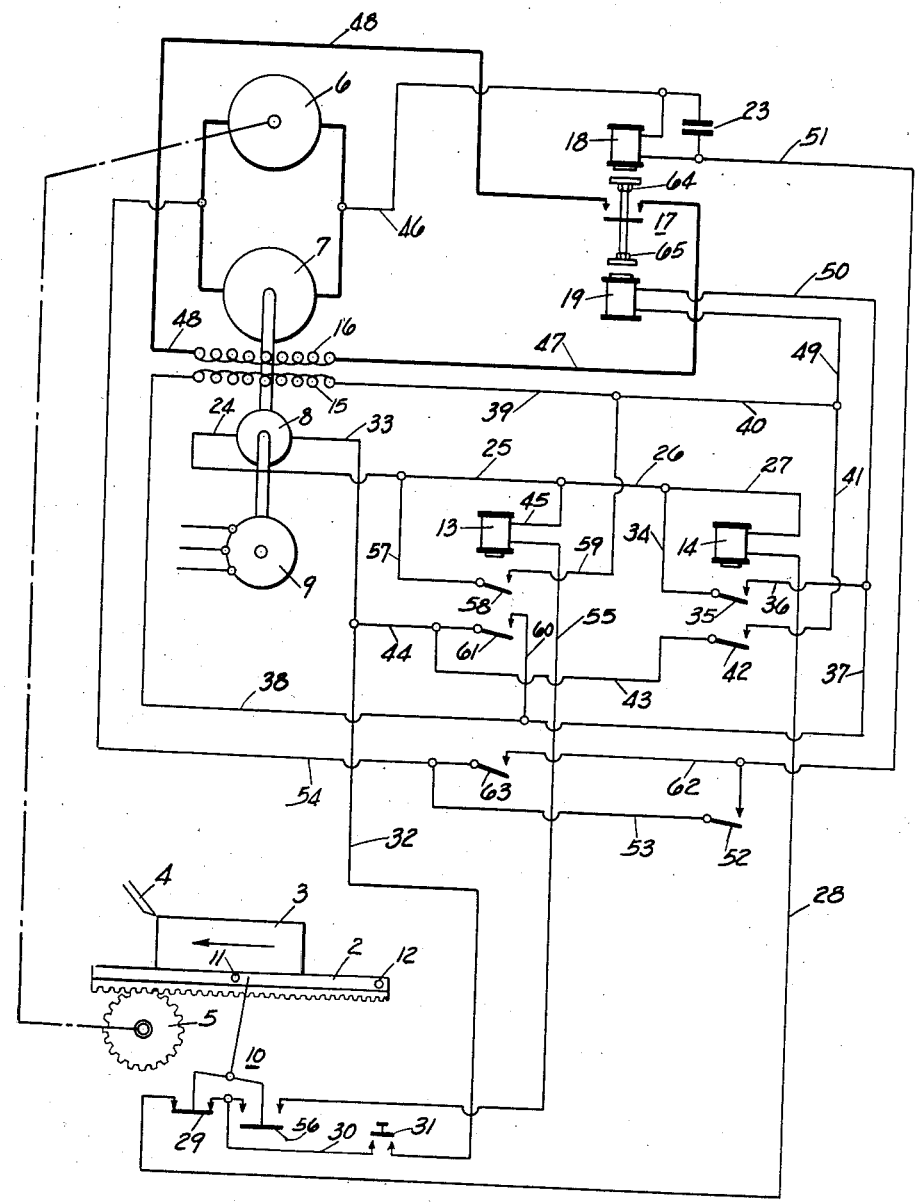
INVENTORS
Carol Levison
Cornelius L. Johnson
Edward J. Bennett
BY
Woodling and Krost, attys.

Patented Feb. 23, 1943

2,312,178

UNITED STATES PATENT OFFICE 2,312,178

ELECTRICAL CONTROL CIRCUIT

Carol Levison, Cornelius L. Johnson, and Edward J. Bennett, Cleveland, Ohio, assignors to The Motor Repair and Manufacturing Company, a corporation of Ohio Application November 15, 1941, Serial No. 419,328

7 Claims. (Cl. 172—239)

Our invention relates in general to electrical control equipment and more particularly to an electrical arrangement for reducing the sparking of commutator brushes of a motor and generator unit incident to the collapsing of the flux of the main field winding of the generator.

Our invention is particularly adaptable in combination with a motor and a generator, each having an armature and a set of commutator brushes connected in loop armature circuit relation with each other wherein the main field winding of the generator is reversibly excited to reverse the rotation of the motor. In actual experience, the commutator brushes of the closed loop armature circuit are subject to a considerable amount of sparking upon the collapsing of the flux of the main field winding of the generator incident to reversing the excitation of the field winding of the generator or incident to the de-energization of the main field winding of the generator when stopping the operation of the equipment. The sparking is extremely severe when the motor is employed to drive a momentum driven piece of equipment. The momentum of the piece of equipment during the stopping or reversing thereof functions to drive the motor as a generator and produces excessive amounts of current in the loop armature circuit which results in excessive sparking of a damaging nature.

An object of our invention is to provide for reducing the sparking at the commutator brushes incident to the collapsing of the field of the main field winding of the generator, even under the most severe operating conditions such, for example, as when the motor is employed to drive a momentum driven piece of equipment.

Another object of our invention is the provision of including an auxiliary field winding on the generator in a closed circuit during the initial stage of the collapsing of the flux of the main field winding of the generator to reduce the sparking at the commutator brushes.

Another object of our invention is the provision of excluding the auxiliary field winding of the generator from the closed circuit during the acceleration of the motor, so as not to interfere with the normal operation of the equipment.

Another object of our invention is the provision of preventing sparking at the commutator brushes while at the same time maintaining substantially the normal operation of the generator and motor of the loop armature circuit.

Another object of our invention is the provision of momentarily holding the closed circuit which includes the auxiliary field winding of the generator in a closed condition during the initial stage of the collapsing of the flux of the main field winding of the generator.

Another object of our invention is the provision of the employment of a capacitor across a relay that governs the interruption of the closed circuit including the auxiliary field winding of the generator to momentarily hold the relay closed and establishing a closed circuit with the auxiliary field winding therein during the initial stage of the collapsing of the flux of the main field winding of the generator.

Another object of our invention is the provision of a lockout relay which prevents the relay that establishes the closed circuit which includes the auxiliary field winding of the generator from closing until the voltage of the loop armature circuit obtains a predetermined value.

Another object of our invention is the provision of withholding the establishment of the closed circuit including the auxiliary field winding of the generator until the voltage of the loop armature circuit has attained a predetermined value, in order to prevent the auxiliary field winding of the generator from interfering with the normal operation of the generator and motor of the loop armature circuit.

Other objects and a fuller understanding of our invention may be had by referring to the following description and claims, taken in conjunction with the accompanying drawing, in which the figure constitutes the embodiment of a control circuit showing our invention, the figure being the only drawing of the application.

Our invention is particularly adaptable to a generator and motor unit employed to reversibly drive a momentum piece of equipment. To this end we have illustrated our control system as being employed to operate a planer indicated diagrammatically by the reference character 2. As shown, the planer is driven by a pinion gear 5 and is arranged to pass a work piece 3 in cutting relation with a suitable tool 4. The pinion gear 5 is arranged to be mechanically driven by a reversing motor 6 which is connected in loop armature circuit with a generator 7. The motor 6 and the generator 7 each have an armature and a set of commutator brushes connected in loop armature circuit. The generator 7 is provided with a main field winding 15 which is arranged to be reversibly energized by means of an exciter 8 controlled by reversing relays 13 and 14 which in turn are governed by a reversing switch 10 actuated by the movement of the planer 2. The reversing switch 10 may be of any suitable construction and as diagrammatically illustrated is arranged to be alternately reversed by reversing stops 11 and 12 carried by the bed of the planer 2. The generator 7 and the exciter 8 are arranged to be driven by a driving motor 9 which may be of an alternating current induction type.

In actual experience, a considerable amount of sparking exists at the commutator brushes included in the closed loop armature circuit upon the collapsing of the flux of the main field winding 15 of the generator 7 incident to reversing the excitation of the main field winding 15 or incident to the deenergization of the main field winding 15 when stopping the equipment. As pointed out hereinbefore, the purpose of our invention is to prevent this excessive sparking upon the collapsing of the flux of the main field winding. We accomplish the purpose of our invention by means of a special or auxiliary field winding for the generator. This special or auxiliary field winding is indicated generally by the reference character 16 and is arranged to be included in a closed circuit during the initial stage of the collapsing of the flux of the main field winding of the generator. The special or auxiliary field winding 16 may be wound upon the same poles on which the main field winding 15 is mounted. The windings upon the poles may be connected in parallel or in series or in parallel-series combination depending upon the circumstances of the particular arrangement. The special or auxiliary field winding is preferably of a relatively low resistance so that a considerable amount of current may be allowed to flow therethrough to modify the action of the generator to prevent excessive sparking at the commutator brushes. The closed circuit which includes the special or auxiliary field winding 16 is controlled by a relay circuit interrupter 17 governed by two relay coils 18 and 19. A capacitor 23 is connected across the coil of the relay 18 in order to insure that the circuit interrupting relay 17 is closed during the initial stage of the collapsing of the flux of the main field winding of the generator.

In explaining the operation of our device, let it be assumed that the planer 2 has just started to move to the left as shown in the drawing, which means that just prior to this condition the reversing stop 11 has actuated the reversing switch 10 to the position shown in the drawing. Immediately upon the actuation of the reversing switch 10 to the position shown in the drawing, a circuit is established for energizing the reversing relay 14 from the exciter 8. This circuit may be traced as follows: Beginning with the terminal conductor 24 of the exciter, current flows through conductors 25, 26, 27, the winding of the relay 14, conductor 28, contactor 29 of the reversing switch 10, conductor 30, a start push button 31, and a conductor 32 to a terminal conductor 33 of the exciter 8. The start push button 31 may be of any suitable construction and is depressed for starting the entire equipment and remains in a closed condition during the reversible operation of the planer. Upon the energization of the reversing relay 14, a circuit is established for energizing the main field winding 15 of the generator which causes the generator 7 to generate a voltage of such polarity as to drive the reversing motor 6 in such direction to drive the planer to the left as shown in the drawing. The circuit for energizing the main field winding 15 of the generator may be traced as follows: Beginning with the terminal conductor 24 of the exciter 8 current flows through conductors 25, 26 and 34, contact 35 of the reversing relay 14, conductors 36, 37 and 38 to the main field winding 15, conductors 39, 40 and 41, contact 42 of the reversing relay 14, and conductors 43 and 44 to the terminal conductor 33 of the exciter 8. The excitation of the main field winding 15 of the generator causes the generator to develop a current flow through the closed loop armature circuit for operating the reversing motor 6. During the acceleration of the motor 6 and while the generator is building up voltage, the special or auxiliary winding 16 remains inactive in that it is not connected in a closed crcuit which includes conductors 47 and 48 and the contactor of the relay circuit interrupter 17. During the accelerating period of the motor 6, the contactor of the relay circuit interrupter 17 is urged in an open position as shown in the drawing by a relay coil 19 which is connected in shunt with the main generator field winding 15. One side of the relay coil 19 beginning at a conductor 50 is connected to the left-hand side of the main field winding 15 through a conductor 38 and the other side of the relay coil 19 beginning at a conductor 49 is connected to the right-hand side of the main field winding 15 through conductors 40 and 39. The relay coil 18 is responsive to the voltage across the loop armature circuit between the generator 7 and the motor 6 and is arranged to overpower the relay coil 19 when the voltage of the loop armature circuit attains a predetermined value. The circuit for energizing the relay coil 18 may be traced from one side of the loop armature circuit beginning at a conductor 46 which leads to the relay coil 18, a conductor 51, a contact 52 of the reversing relay 14, and conductors 53 and 54 to the opposite side of the loop armature circuit. The arrangement of the relay coils 18 and 19 which governs the opening and closing of the contactor of the circuit interrupter for the closed circuit including the special or auxiliary field winding 16 is such that the closed circuit is open during the accelerating period of the motor 6 and remains open until the voltage generated by the generator 7 is substantially at its normal operating value at which time the relay coil 18 overpowers the relay coil 19 and closes the contactor of the interrupter 17. The closing of the contactor 17 establishes the closed circuit for including the special or auxiliary winding 16 but the establishment of this closed circuit does not interfere with the normal operation of the generator and motor and the reason that the closed circuit is not established until the generator has substantially reached its normal operating voltage condition. In other words, the closed circuit is established after the flux of the generator has become substantially constant so that the inclusion of the special or auxiliary winding 16 produces substantially no effect upon the operation of the motor and generator since the winding 16 is effective only in modifying the conditions of the motor and generator under conditions of changeable flux, which is a condition which exists during the reversing of the excitation of the main field winding or when the main field winding is de-energized by stopping the equipment at the interruption of the start push button 31.

As the planer 2 reaches the end of its movement to the left, the reversing stop 12 engages the reversing switch 10 and actuates the reversing switch to its opposite position as shown in the drawing. The instant that the reversing switch 10 is actuated to its reversed position, the relay 14 becomes de-energized and the relay 13 becomes energized for exciting the main field winding 15 of the generator in the reverse direction for driving the motor in the reverse direction to make the planer move to the right. The moment that the reversing relay 14 is de-energized the circuit which formerly energized the relay coil 18 is interrupted by the opening of the contact 52. The interruption of the circuit which formerly energized the relay coil 18 does not cause the contactor of the circuit interrupter 17 to immediately open for the reason that the capacitor 23 discharges through the winding of the relay coil 18 and momentarily holds the contactor of the circuit interrupter 17 closed. The discharge of the current from the capacitor 23 through the winding of the relay coil 18 holds the contactor 17 closed for a fraction of a second but this is sufficient to maintain the special or auxiliary winding 16 in a closed circuit during the initial stage of the collapsing of the flux of the main field 15 incident to the operation of the reversing relays 14 and 13. The momentary inclusion of the special or auxiliary field winding 16 in the closed circuit is sufficient to cut down the sparking of the commutator brushes included in the loop armature circuit.

Upon the reversing of the reversing switch 10 by the reversing stop 12, a circuit for energizing the reversing relay 13 may be traced as follows: Beginning with the terminal conductor 24 of the exciter 8, current flows through conductors 25 and 45, the winding of the reversing relay 13, a conductor 55, the contactor 56 of the reversing switch 10, conductor 30, the start push button 31, and the conductor 32 to the terminal conductor 33 of the exciter 8. Upon the energization of the reversing relay 13, a circuit is established for energizing the main field winding 15 in a reverse direction for operating the motor 6 in a reverse direction for driving the planer 2 to the right. The circuit for energizing the main field winding 15 in the reverse direction may be traced as follows: Beginning at the terminal conductor 24 of the exciter 8, current flows through conductor 57, contact 58, conductors 59 and 39, the main field winding 15, conductors 38 and 60, contact 61 of the relay 13 and a conductor 44 to the terminal conductor 33 of the exciter 8. Upon the energization of the main field winding 15 by the closing of the reversing relay 13, the relay coil 19 of the circuit interrupter 17 again is energized since it is in shunt with the main field winding 15 of the generator. As explained before, the relay coil 19 overpowers the relay coil 18 during the acceleration of the motor 6 and prevents the contactor of the circuit interrupter 17 from closing the closed circuit which includes the special or auxiliary field winding 16. As the voltage of the generator 7 attains substantially its normal operating value the coil of the relay 18 overpowers the coil of the relay 19 and closes the contactor of the circuit interrupter 17 for including the special or auxiliary field winding 16 in the closed circuit. As explained hereinbefore, the inclusion of the special or auxiliary field winding 16 in the closed circuit does not materially interfere with the normal operation of the generator and motor for the reason that the flux of the main field winding 15 is established before the closed circuit is closed. The motor 6 continues to run until the reversing stop 11 again actuates the reversing switch 10 to the position as shown in the drawing, at which time the relay 13 becomes de-energized and the relay 14 is again re-energized. The de-energization of the relay 13 interrupts the circuit which formerly energized the relay coil 18 at the opening of the contact 63. Prior to the opening of the contact 63 the relay coil 18 was energized through a circuit including conductor 46 which leads from the loop armature circuit to the relay coil 18, conductors 51 and 62, the contact 63 of the relay 13 and the conductor 54 to the opposite side of the loop armature circuit. The interruption of the contact 63 opens the circuit for energizing the relay coil 18 but the condenser or capacitor 23 functions to discharge in through the winding of the coil 18 to hold the relay 18 momentarily energized for maintaining the contactor 17 closed during the initial stage of the collapsing of the flux of the main field winding incident to the de-energization of the relay 13.

The air gap for the relay coils 18 and 19 may be adjustable by the adjusting nuts 64 and 65. In this manner, the closing of the contactor of the circuit interrupter 17 may be governed to attain the most satisfactory result in reducing the sparking of the commutator brushes. That is to say, the special or auxiliary field winding 16 is included in the closed circuit at substantially the time that the flux of the main field winding 15 is established so that by its inclusion therein there is no interference with the normal operation of the motor and generator since the special or auxiliary field winding functions only to effect the generator and motor under conditions of changing flux. Experience shows that the special or auxiliary field winding 16 need only remain in the closed circuit for a fraction of a second at the instant that the flux of the field winding 15 begins to collapse. We find that the capacitor 23 is in a position to maintain the relay 18 closed for a fraction of a second during which time a sufficient amount of dampening has taken effect by the action of the special or auxiliary field winding 16 to prevent sparking at the commutator brushes. In other words, the special or auxiliary field winding 16 remains in the closed circuit until the voltage of the generator drops to a point where the sparking of the commutator brushes does not exist.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. The combination with a generator and a motor, each having an armature and a set of commutator brushes connected in loop armature circuit relation with each other, main field winding means for the generator, reversing means for reversing the excitation of the main field winding means of the generator and thereby reversing the rotation of the motor, of electrical means for reducing the sparking at the commutator brushes incident to the collapsing of the flux of the main field winding means of the generator, said electrical means comprising a circuit including an auxiliary field winding means for the generator, said circuit also including circuit interrupting means for opening and closing the said circuit, means for insuring that the circuit interrupting means is closed during the initial stage of the collapsing of the flux of the main field winding means of the generator, said insuring means causing said circuit interrupting means to close the said circuit at substantially the time that the flux of the main field winding means of the generator is established and to open the said circuit after the initial collapse of said flux.

2. The combination with a generator and a motor, each having an armature and a set of commutator brushes connected in loop armature circuit relation with each other, main field winding means for the generator, reversing means for reversing the excitation of the main field winding means of the generator and thereby reversing the rotation of the motor, of electrical means for reducing the sparking at the commutator brushes incident to the collapsing of the flux of the main field winding means of the generator, said electrical means comprising a circuit including an auxiliary field winding means for the generator, said circuit also including circuit interrupting means for opening and closing the said circuit, electrical responsive means for governing the circuit interrupting means, circuit connection means for connecting the electrical responsive means in circuit relation with the loop armature circuit, and means responsive to the reversing means for controlling the circuit connection means and the opening of the circuit interrupting means, said circuit interrupting means closing the said circuit at substantially the time that the flux of the main field winding means of the generator is established and opening the said circuit after the initial collapse of said flux, thereby insuring that the said circuit is closed during the initial stage of the collapsing of the said flux to reduce the sparking at the commutator brushes.

3. The combination with a generator and a motor, each having an armature and a set of commutator brushes connected in loop armature circuit relation with each other, main field winding means for the generator, reversing means for reversing the excitation of the main field winding means of the generator and thereby reversing the rotation of the motor, of electrical means for reducing the sparking at the commutator brushes incident to the collapsing of the flux of the main field winding means of the generator, said electrical means comprising a circuit including an auxiliary field winding means for the generator, said circuit also including relay means for opening and closing the said circuit, circuit connection means for connecting the relay means in circuit relation with the loop armature circuit, said relay means closing said circuit upon the establishment of a predetermined voltage across the loop armature circuit at substantially the time that the flux of the main field winding means of the generator is established, contact means responsive to the reversing means for controlling the circuit connection means and the relay means, said contact means opening the circuit connection means and de-energizing the relay means upon the interruption of the main field winding means, and a capacitor across the relay means to hold the relay means and the closed circuit momentarily closed during the initial stage of the collapsing of the flux of the main field winding means, said relay means opening the said circuit after the initial collapse of said flux and thereafter maintaining the said circuit open until the re-closing thereof upon the re-establishment of said flux.

4. The combination with a generator and a motor, each having an armature and a set of commutator brushes connected in loop armature circuit relation with each other, main field winding means for the generator, reversing means for reversing the excitation of the main field winding means of the generator and thereby reversing the rotation of the motor, of electrical means for reducing the sparking at the commutator brushes incident to the collapsing of the flux of the main field winding means of the generator, said electrical means comprising a circuit including an auxiliary field winding means for the generator, said circuit also including circuit interrupting means for opening and closing the said circuit, electrical opposing means for actuating the circuit interrupting means, one of said opposing means being responsive to the condition of the loop armature circuit, the other of said opposing means being responsive to the condition of the main field winding means, the said one of the opposing means over-powering the said other of said opposing means and closing the circuit upon the establishment of a predetermined voltage across the loop armature circuit at substantially the time that the flux of the main field winding means of the generator is established, contact means responsive to the reversing means for de-energizing the said one of said opposing means upon the interruption of the main field winding means, and a capacitor across the said one of said opposing means to hold the circuit interrupting means and the closed circuit momentarily closed during the initial stage of the collapsing of the flux of the main field winding means, said circuit interrupting means opening the said circuit after the initial collapse of said flux and thereafter maintaining the said circuit open until the re-closing thereof upon the re-establishment of said flux.

5. The combination with a generator and a motor, each having an armature and a set of commutator brushes connected in loop armature circuit relation with each other, main field winding means for the generator, reversing means for reversing the excitation of the main field winding means of the generator and thereby reversing the rotation of the motor, of electrical means for reducing the sparking at the commutator brushes incident to the collapsing of the flux of the main field winding means of the generator, said electrical means comprising a circuit including an auxiliary field winding means for the generator, said circuit also including circuit interrupting means for opening and closing the said circuit, and means responsive to the condition of the loop armature circuit, the main field winding means and the reversing means for governing the circuit interrupting means and the opening and closing of the said circuit, said circuit interrupting means closing the said circuit at substantially the time that the flux of the main field winding means of the generator is established and opening the said circuit after the initial collapse of said flux, thereby insuring that the said circuit is closed during the initial stage of the collapsing of the said flux to reduce the sparking at the commutator brushes.

6. The combination with a generator and a motor, each having an armature and a set of commutator brushes connected in loop armature circuit relation with each other, main field winding means for the generator, reversing means for reversing the excitation of the main field winding means of the generator and thereby reversing the rotation of the motor, of electrical means for reducing the sparking at the commutator brushes incident to the collapsing of the flux of the main field winding means of the generator, said electrical means comprising a circuit including an auxiliary field winding means for the generator, said circuit also including circuit interrupting means for controlling the opening and closing thereof, said circuit interrupting means having two opposed coil means, first circuit means for connecting one of said coil means in circuit relation with the loop armature circuit, second circuit means for connecting the other of said coil means in circuit relation with the main field winding means, and means responsive to the reversing means for interrupting the first circuit means and the said one of said coil means of the said circuit interrupting means, said circuit interrupting means closing the said circuit at substantially the time that the flux of the main field winding means of the generator is established and opening the said circuit after the initial collapse of said flux, thereby insuring that the said circuit is closed during the initial stage of the collapsing of the said flux to reduce the sparking at the commutator brushes.

7. The combination with a generator and a motor, each having an armature and a set of commutator brushes connected in loop armature circuit relation with each other, main field winding means for the generator, reversing means for reversing the excitation of the main field winding means of the generator and thereby reversing the rotation of the motor, of electrical means for reducing the sparking at the commutator brushes incident to the collapsing of the flux of the main field winding means of the generator, said electrical means comprising a circuit including an auxiliary field winding means for the generator, said circuit also including circuit interrupting means for controlling the opening and closing thereof, said circuit interrupting means having two opposed coil means, first circuit means for connecting one of said coil means in circuit relation with the loop armature circuit, second circuit means for connecting the other of said coil means in circuit relation with the main field winding means, the said one of said coil means overpowering the said other of said coil means and closing the said closed circuit upon the establishment of a predetermined voltage across the loop armature circuit at substantially the time that the flux of the main field winding means of the generator is established, and means responsive to the reversing means for interrupting the first circuit means and the said one of said coil means of said circuit interrupting means, and a capacitor across the said one of said coil means to hold the said circuit momentarily closed upon the interruption of the first circuit means during the initial stages of the collapsing of the flux of the main field winding means to prevent sparking of the commutator brushes, said circuit interrupting means opening the said circuit after the initial collapse of said flux and thereafter maintaining the said circuit open until the re-closing thereof upon the re-establishment of said flux.

CAROL LEVISON.
CORNELIUS L. JOHNSON.
EDWARD J. BENNETT.